Dec. 10, 1968 A. LEGER 3,415,394
EMERGENCY STARTING DEVICE AND HANDLING MECHANISM FOR AUTOMOBILES
Filed Oct. 18, 1966 2 Sheets-Sheet 1

INVENTOR
ADRIEN LEGER

ATTORNEY

Dec. 10, 1968  A. LEGER  3,415,394
EMERGENCY STARTING DEVICE AND HANDLING MECHANISM FOR AUTOMOBILES
Filed Oct. 18, 1966  2 Sheets-Sheet 2
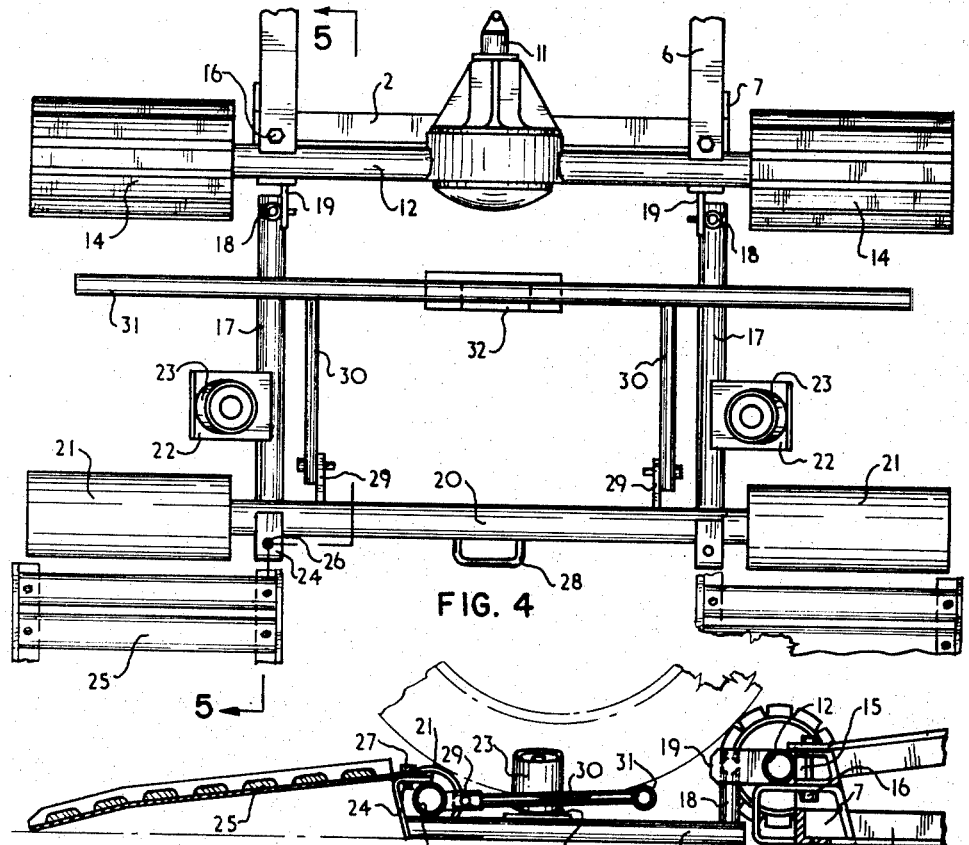
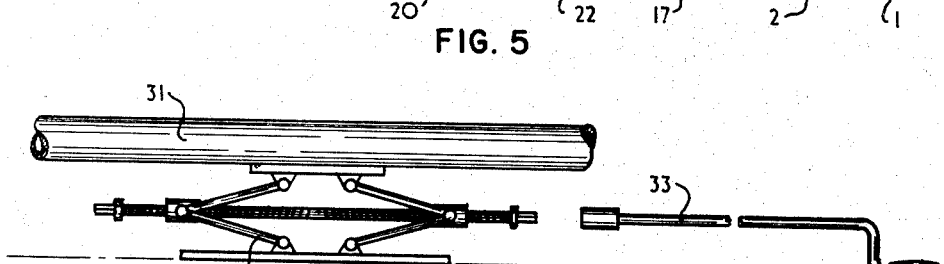
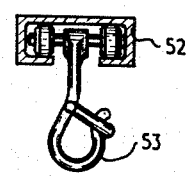
INVENTOR
ADRIEN LEGER
ATTORNEY

United States Patent Office 3,415,394
Patented Dec. 10, 1968

3,415,394
EMERGENCY STARTING DEVICE AND HANDLING MECHANISM FOR AUTOMOBILES
Adrien Leger, 225-R5, St. Louis de Gonzague, Quebec, County of Beauharnois, Canada
Filed Oct. 18, 1966, Ser. No. 587,615
4 Claims. (Cl. 214—75)

ABSTRACT OF THE DISCLOSURE

A transportable emergency starting device for stalled automobiles, having a self-contained or independent motor-powered wheel spinning apparatus with a foldably connected ramp section up which the drive wheels of a stalled car can be drawn to engage the spinning apparatus, the whole device being easily unloaded from and reloaded on a light truck.

---

This invention relates to improvements in an emergency starting device for automobiles and appertains particularly to a portable, power driven unit on which the drive wheels of an automobile may be mounted and spun.

Treadmill type wheel spinners are known but have been too heavy, clumsy and expensive, or have not been able to provide adequate r.p.m. to start the engines of motor cars equipped with automatic transmissions where a wheel speed in the 15–20 miles per hour range is regarded as necessary.

It is an object of the present invention to provide an automobile starting device that is a self-contained unit with its own motor-powered wheel spinning mechanism.

A further object is to provide a wheel spinning automobile starter with motor operated means for drawing the drive wheels of a stalled car into operative engagement with its motor-powered wheel spinning mechanism.

A further object of the invention is to provide an automobile starting device that may be readily transported in a light truck and having a truck-carried rack by means of which the starter can be loaded into the truck or unloaded therefrom by utilizing its own motor power.

A further object of the invention is to provide an automobile starting device able to discharge the drive wheels of an automobile therefrom following the starting of the motor of the stalled car.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throghout the several views.

In the drawings:

FIGURE 4 is a plan view thereof with the said section opened out;

FIGURE 5 is a sectional elevational detail as taken on line 5—5 of FIGURE 4;

FIGURE 6 is an end elevation detail of the device for discharging the drive wheels of a car after its engine has been started; and FIGURE 7 is an enlarged cross sectional detail of the truck-carried rack's track, as taken on line 7—7 of FIGURE 1.

Figure 1:
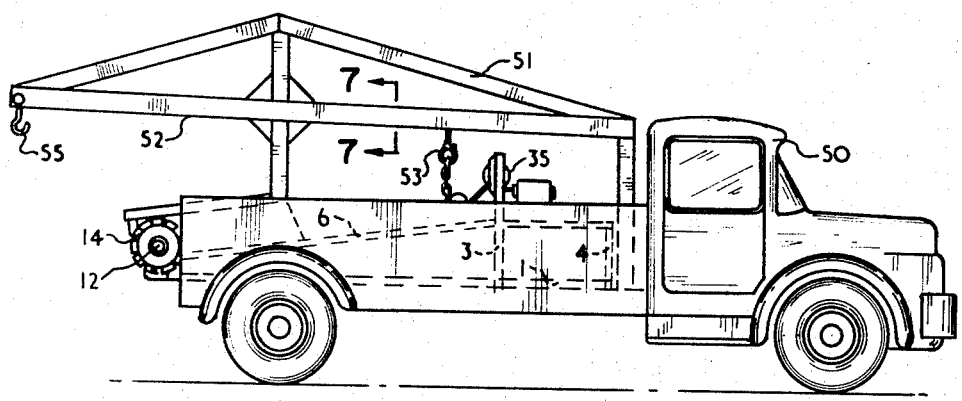
FIGURE 1 is a side elevation of a rack-equipped light truck carrying my wheel spinning automobile starter.

The starting device includes a frame having a pair of longitudinally extending spaced parallel base members 1 and cross members 2 joining the same at front and rear. A pair of posts 3 rise from the base members 1 near the front of the frame and a pair of shorter uprights 4 rise from the base members at the forward end. Horizontal frame members 5 connect the top of the uprights 4 with the posts 3 and beams 6 slope downwardly from the posts 3 at the level of the horizontal frame members 5 to the rear of the base members 1 where they are suitably secured to the base members 1 as by welded brackets 7. A cross beam 8 connects the top of posts 3.

An engine 10 such as a small, lightweight air-cooled automobile motor is mounted in the forward part of the frame between the posts 3 and uprights 4, having a drive shaft 11 extending rearwardly to a transversely disposed differential axle housing 12 carried by the frame brackets 7 and projecting laterally therebeyond. A traction drum 14 is provided on each end of the engine driven axle outwardly of the frame. It is desirable that the axle housing 12 be releasably mounted in the brackets 7 as by axle lugs 15 held by bolts 16 (see FIGURES 4 and 5) so that it may be inverted and thereby permit the rotation of the drums 14 in reversed direction if needed, as when used with a front drive motor car.

Extending rearwardly from the main body of the starter is the supplementary section of the wheel spinning apparatus. It includes a spaced pair of longitudinally disposed tubular members 17 each with a short post 18 at its forward end that is pivotally connected to a lug 19 on the axle housing 12. At their rear ends the members 17 carry a transverse shaft 20 on whose outer ends idler drums 21 are rotatably mounted. Forwardly of the drums 21, brackets 22 extending outwardly from the frame extension members 17 carry side thrust idler rollers 23 inclined inwardly from the vertical.

Figure 2:
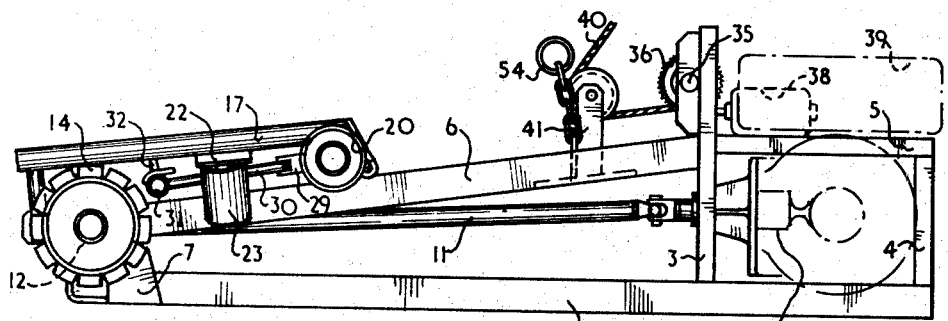
FIGURE 2 is an enlarged side elevation of the motor-powered, wheel spinning starter, with the wheel spinning section in folded position.
Figure 3:
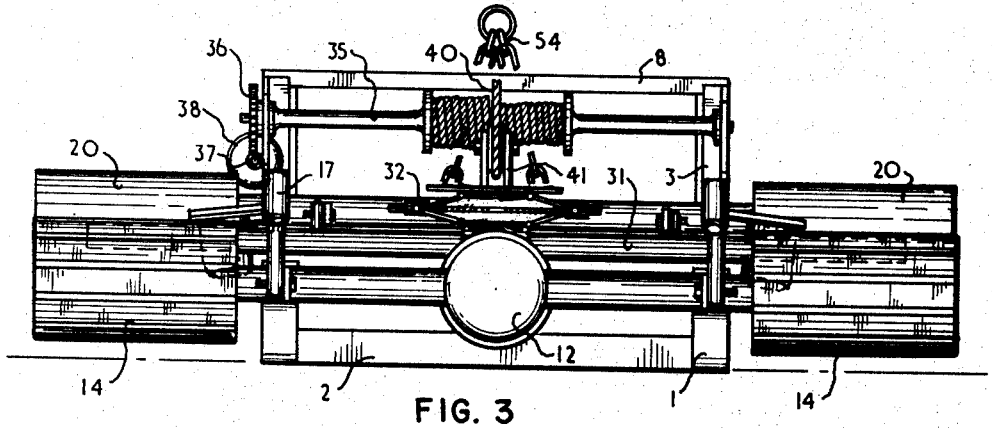
FIGURE 3 is a rear elevation thereof.

On the rear of shaft 20 and tubular members 17 a pair of brackets 24 are provided for the handy hook-on attachment of a wheel track ramp 25, being perforated as at 26 for the reception of a removable pin 27. A hand grip 28 is also secured to the shaft 20 for swinging this section of the wheel spinning apparatus on pivot lugs 19 into compact folded position, as shown in FIGURE 2.

Pivotally connected to the shaft 20 by spaced lugs 29 is a forwardly extending pair of arms 30 supporting a transverse bar 31 that extends outwardly over the foldable section members 17. The bar carries a ground-engaging toggle type jack 32 on its under side, operable by a removable hand crank 33, by which the bar may be raised for the purpose of throwing the drive wheels of a car that were resting on the traction drums 14 and idler drums 21 off the starting device and down the wheel track ramp 25. This may be regarded as an ejector or a discharging or dismounting device.

On the rear of posts 3 a winch is provided including a rotatable transverse shaft 35 with a gear wheel 36 thereon that is engaged by a worm gear 37 driven by a reversible electric motor 38. Batteries for both the motor 38 and wheel spinning engine 10 are located above the engine 10 as indicated at 39. From the winch a cable 40 leads through a pulley sheave 41 for temporary attachment to a car to be drawn up the ramp tracks 25 and onto the wheel spinning apparatus.

Winch 35 and cable 40 are useable also in loading and unloading the starting unit from a truck. In FIGURE 1, a light open box truck 50 is shown that is provided with a loading rack 51 removably mounted in the box. The rack frame supports a raised track 52, arranged on the longitudinal median of the truck and declining slightly towards the front, in which a roller-carried hanger hook 53 travels. When the starting unit is loaded in the truck it is suspended from the hook 53 by a chain yoke 54 or the like that may be attached to the pulley sheave 41 or its frame support. However, the length of the yoke 54 is such that as the unit slides forward on the declining track 52, it comes to rest on the floor of the truck box as it reaches its forward limit. Conversely, as the starting unit is withdrawn rearwardly, it rides up the slightly inclined rail that overhangs the rear of the box until the roller-carried hanger 53 reaches the end of the track when the cable 40 is connected with another hook 55 permanently mounted on the rear end of the track. By winching the cable 40 that passes around the sheave 41, the chain yoke 54 is released from the hanger hook 53 and then the rotation of the winch is reversed and the starting device is lowered to the ground. It will be noted that when the unit is in the truck box the supplementary section of the wheel spinning mechanism lying to the rear of the traction drums 14 is in folded position, being hinged forwards on the axle housing pivot lugs 19.

In use, the starter is loaded on and transported in truck 50 to the location of the disabled automobile. There the unit suspended by its chain yoke 54 from the rack frame track 52 is pushed to the rear of the track, its winch cable 40 connected to the end hook 55 and the winch operated to allow disconnection of the chain yoke and then to lower the unit to the ground. The winch is arranged in position, unfolded and the track ramps 25 are attached. Next the winch cable which has been released from the end hook 55, is connected to the rear of the disabled car when the further operation of the winch hauls the car's gear drive wheels up the ramps and into nested position between the traction drums 14 and idler drums 21 and laterally lightly engaging or just clearing the side thrust idler rollers 23. The wheel spinning motor 10 is started and 'reved up' so that the traction drums 14 cause the engaged drive wheels of the disabled automobile to rotate at the equivalent of a ground speed of approximately 20–25 m.p.h., which I have found sufficient for modern cars equipped with automatic transmission. When the disabled car's engine has been started and is running smoothly, the gear selector is placed in neutral and the automobile is thrown off the starter's wheel spinning apparatus by cranking up the jack 32 on the ejecting or demounting bar 31 that lifts the rear wheels over the idling drums 21 and rolls the car down the track ramps 25. Thereafter the track ramps are disconnected, the supplementary section is hinged forwards into overlying folded position and the starter unit raised by its winch cable 40 to the truck track frame track and rolled forward on the declining track until it comes to rest again on the floor of the truck box.

From the foregoing description taken in connection with the accompanying drawings, it will be manifest that an easily loaded, readily transportable motor-powered, wheel spinning starting device for automobiles is provided that will fulfill all the necessary requirements of such a device.

What is claimed as new is:

1. A readily transportable emergency starting device for automobiles comprising motor-powered wheel spinning apparatus; winching means useable for drawing the drive wheels of a disabled car onto said apparatus; and means for subsequently discharging such drive wheels therefrom, in which said wheel spinning apparatus includes motor driven traction drums and a supplementary section foldably connected thereto having idler drums and side-thrust rollers.

2. The starting device according to claim 1, having wheel track ramps disconnectably attached to said supplementary section.

3. The combination with the starting device of claim 1, of a demountable rack for a truck box selectably engageable by said winching means, a raised track extending longitudinally of said rack, declining slightly towards the front of the truck box, a roller carried hanger hook movable along said track and a suspending yoke on said starting device releasably attachable to said hanger hook, whereby when said starting device suspended from said hanger hook is moved forward on said track it comes to rest on the floor of said truck box.

4. The starting device according to claim 1, wherein said wheel spinning apparatus includes a frame having a pair of longitudinally extending spaced parallel base members, a rear cross member joining the same, brackets secured thereto, and a motor driven traction drum assembly having a transversely disposed differential axle housing, axle driven drums on opposite ends thereof, said housing being releasably carried by said brackets enabling the same to be inverted to allow of rotation of said drums in reversed direction when desired.

References Cited

UNITED STATES PATENTS

| | | | |
|---|---|---|---|
| 1,677,733 | 7/1928 | Schiftner | 214—85.1 |
| 2,185,246 | 1/1940 | Cunningham | 74—14 X |
| 2,646,180 | 7/1953 | Schlough et al. | |
| 3,148,549 | 9/1964 | Mohamed | 74—14 X |

HUGO O. SCHULZ, *Primary Examiner.*

U.S. Cl. X.R.

214—340, 334; 74—14